United States Patent [19]

Sinberg

[11] Patent Number: 4,567,539
[45] Date of Patent: Jan. 28, 1986

[54] POWER INTERRUPTION AND BROWNOUT DETECTOR

[75] Inventor: Howard Sinberg, Coral Springs, Fla.
[73] Assignee: Siemens Corporate Research & Support, Inc., Iselin, N.J.
[21] Appl. No.: 592,681
[22] Filed: Mar. 23, 1984
[51] Int. Cl.$^4$ .............................................. H02H 3/24
[52] U.S. Cl. ....................................... 361/92; 361/86; 361/88; 340/663; 307/200 A
[58] Field of Search ...................... 361/78, 86, 88, 90, 361/92; 307/200 A; 340/660, 661, 663

[56] References Cited

U.S. PATENT DOCUMENTS 4,016,459 4/1977 Boehringer ....................... 361/78 X
4,394,702 7/1983 Boothe .............................. 361/71 X

OTHER PUBLICATIONS

IBM Technical Disclosure Bulletin, vol. 17, No. 8, pp. 2380–2382, Jan. 1975, AUTH.: T. E. Stammely.

Primary Examiner—Patrick R. Salce
Attorney, Agent, or Firm—Thomas H. Jackson

[57] ABSTRACT

This invention relates to apparatus which can detect both interruptions and reductions in an alternating current input extremely quickly. This allows an orderly shut down of the equipment before the output of the equipment power supply decays. The device can be utilized in any application requiring detection of changes in an alternating current input.

5 Claims, 2 Drawing Figures

POWER INTERRUPTION AND BROWNOUT DETECTOR

BACKGROUND OF THE INVENTION

This invention relates to apparatus for the detection of changes in an alternating current input. This detection is very important for the proper operation of many complex devices, such as computers and telephones exchanges.

Existing devices for detecting changes in an alternating current input do not react rapidly enough for computers, thelephone exchanges or similar devices. The also do not detect both a manually selectable brownout level (reduced voltage level) and a total power failure. Additionally, output jitter resulting from a series of momentary power interruptions frequently occurs in power interruption detectors.

SUMMARY OF THE INVENTION

This invention provides an inexpensive and highly reliable device for rapidly detecting both a brownout level and a power interruption in a alternating current input. This allows an orderly shutdown before the output of a power supply decays. The device can be utilized in any application requiring detection of changes in an alternating current input. The device enables the level required to activate a brownout condition to be freely varied depending upon predetermined requirements. Additionally, output jitter due to momentary power interruptions is avoided.

In general, the invention features a power interruption and brownout detector for an alternating current voltage source, having: rectification apparatus for converting the alternating current voltage source output to pulsating direct current voltage; a direct current voltage source which provides first and second reference voltages; a first comparator which compares the output of the rectification apparatus with the first reference voltage; a voltage storage device, associated with the first comparator, which is charged by the direct current voltage source when the output of the rectification apparatus is less than the first reference voltage; a second comparator which compares the voltage storage device voltage with the second reference voltage; and an indication device, associated with the second comparator, which indicates the existence of a power interruption or brownout condition when the voltage storage device voltage is greater than the second reference voltage.

In preferred embodiments of the power interruption and brownout detector the rectification apparatus includes a pair of power rectifier diodes; the voltage storage device is a capacitor; a variable resistor is connected to the rectification apparatus for varying the apparatus output, and the variable resistor can be set to a particular value to select a predetermined level for indication of a brownout condition; and apparatus for first increasing and then decreasing the first reference voltage following an indication of a power interruption or brownout condition so that the duration of the power interruption or brownout condition indication is of sufficient length to avoid output jitter.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
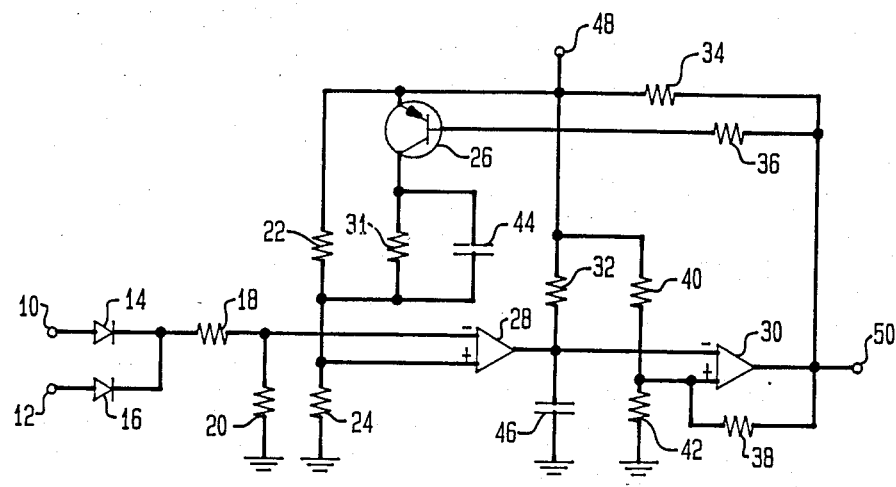
FIG. 1 is a schematic diagram of a power interruption and brownout detector for monitoring a conventional 110 volt alternating current source through a power transformer such as might be associated with a computer or telephone exchange power supply.

Referring to FIG. 1, an embodiment of the invention will now be described for monitoring a conventional 110 volt, 60 Hz alternating current voltage supply.

The voltage source being monitored is connected to terminals 10 and 12. The monitored voltage source is preferably balanced with respect to ground, the balancing provided by a power transformer (not shown) having a secondary winding with a grounded center tap. Diodes 14 and 16, which are typically power rectifier diodes, convert the alternating current source voltage to a direct current voltage. Resistors 18 and 20 have values of 100 K Ω and 12 K Ω respectively, and resistors 22 and 24, which provide the first reference voltage, are each 10 K Ω resistors. Transistor 26 is typically a 2N2907A transistor, and comparators 28 and 30 are typically National Semiconductor LM111 comparators. Resistors 31, 32, 34, 36 and 38 have values of 86.6 K Ω, 453 K Ω, 2.2 K Ω, 4.7 K Ω, and 1.0 M Ω respectively. Resistors 40 and 42, which provide the second reference voltage, are 34.8 K Ω and 33.2 K Ω resistors respectively. Capacitors 44 and 46 are 10 μfd and 0.1 μfd capacitors respectively.

The operation of the invention will now be described in detail with reference to FIG. 1.

The inverting input of comparator 28, which is typically 120 Hz (8⅓ ms) pulses is compared in amplitude by comparator 28 to the first reference voltage which is established by resistors 22 and 24 and by a direct current voltage source (typically 5 volts) applied to terminal 48. Normally the output of comparator 28 is a ground-going pulse stream which discharges capacitor 46 every 8Δ ms. Capacitor 46 is partially charged through resistor 32 between pulses. The output of comparator 28 is open collector, (comparator 28 providing no output voltage in its non-grounding state) and therefore it does not contribute to charging capacitor 46. If the pulses are missing—this occurs when power is interrupted—for a period of time which is dependent upon the values of capacitor 46, resistors 32, 40, and 42, then capacitor 46 is charged to a voltage which exceeds the second reference voltage which is established by resistors 40 and 42 and by the direct current voltage source applied to terminal 48. This occurs whenever comparator 28 determines that the first reference voltage exceeds the voltage output of diodes 14 and 16. This causes the output of comparator 30 to be pulled to ground, indicating a power interruption, when the voltage stored in capacitor 46 exceeds the second reference voltage. When the output of comparator 30 goes to ground, transistor 26 will conduct. This in effect shunts resistor 22 with resistor 31 and capacitor 44, and capacitor 44 causes the first reference voltage at the non-inverting input of comparator 28 to go very high and gradually decrease as capacitor 44 charges. This ensures a power failure indication for a reasonable period of time and eliminates output jitter caused by a series of momentary power interruptions. The signal indicating a power interruption or brownout condition is provided at terminal 50.

The voltage on capacitor 46 is defined by:

$$V = V_B(1 - e^{-t/T}) + V_s$$

where:
V = the voltage on capacitor 46;
$V_B$ = the direct current voltage applied at terminal 48;
t = the time in seconds since the last pulse from comparator 28;
T = the time constant RC for resistor 32 and capacitor 46 (with the resistance expressed in ohms and the capacitance expressed in farads); and
$V_S$ = the output saturation voltage of comparator 28.

An advantageous feature of this device is that even though the direct current voltage sources supplied at terminal 48 may vary, this does not effect the time required for determining the presence of a power interruption or brownout condition. This is because the voltage to which capacitor 46 was charged (which is dependent on the direct current voltage source) is always compared to the second reference voltage which is also dependent on the direct current voltage source and resistors 40 and 42.

Figure 2:
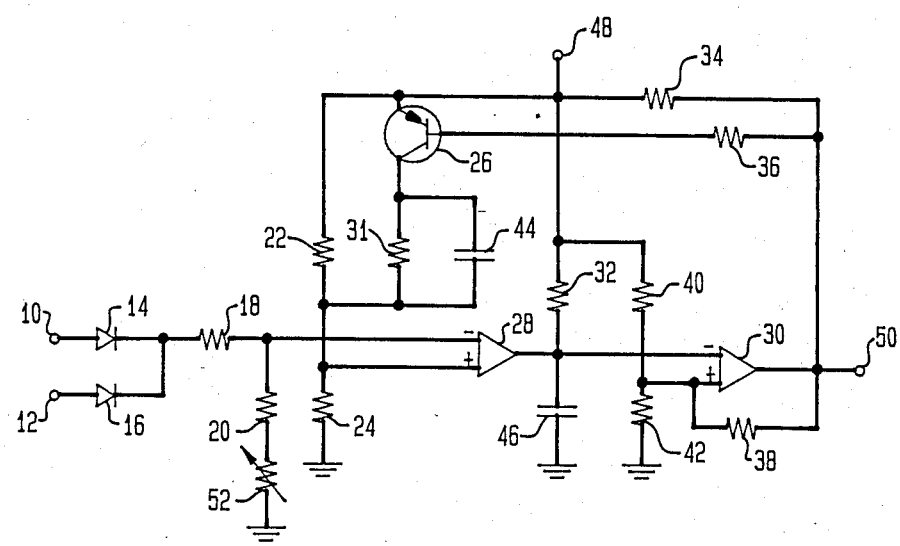
FIG. 2 is a schematic diagram of the brownout detector of FIG. 1, which includes apparatus for selecting the brownout level which will activate indication of a brownout condition.

In an alternate embodiment of the invention, shown in FIG. 2, variable resistor 52 is included in the circuit. Variable resistor 52 can be set to a desired value in order to control the input to comparator 28 so that when the alternating current voltage source falls below some predetermined brownout level failure can be indicated by a signal provided at terminal 50. This variable resistor therefore allows the brownout level required to trigger detection by the circuit to be set at whatever level is appropriate for the equipment being utilized.

There has been shown and described a novel power interruption and brownout detector which fulfills all the objects and advantages sought. Many changes, modifications, variations and other uses and applications of the invention will, however, become apparent to those skilled in the art after considering the specification and the accompanying drawings which disclose embodiments of the invention. All such changes, modifications, variations and other uses and applications which do not depart from the spirit and scope of the invention are deemed to be covered by the invention which is limited only by the claims which follow.

I claim:

1. A power interruption and brownout detector for an alternating current voltage source, comprising:
   (a) rectifier means for converting the alternating current voltage source output to pulsating direct current voltage;
   (b) a direct current voltage source which provides first and second reference voltages;
   (c) a first comparator which compares the output of the rectification means with the first reference voltage, the first comparator being of the type for providing two output states, a first state providing a grounding condition and a second state for providing no output voltage contribution;
   (d) a voltage storage device associated with the first comparator, the device being charged by the direct current voltage source when the output of the rectifier means is less than the first reference voltage and discharged during the first state of the first comparator;
   (e) a second comparator which compares the voltage storage device voltage with the second reference voltage; and
   (f) means, associated with the second comparator, for indicating a power interruption or brownout condition when the voltage storage device voltage is greater than the second reference voltage.

2. The power interruption and brownout detector of claim 1, wherein the voltge storage device comprises a capacitor.

3. The power interruption and brownout detector of claim 1, further comprising a variable resistance element connected to a pair of power rectifier diodes connected in parallel, the variable resistance for varying the rectifier means output, the variable resistance element being settable to select a predetermined level for indication of a brownout condition.

4. The power interruption and brownout detector of claim 1, further comprising means for increasing and then decreasing the first reference voltage following an indication of a power interruption or brownout condition so that the duration of the power interruption or brownout condition indication is sufficient to avoid output jitter, said means comprising a switching transistor whose base is connected to the output of the second comparator and whose emitter is connected through a shunting circuit to the first reference voltage input of the first comparator.

5. A power interruption and brownout detector for an alternating current voltage source comprising:
   (a) a rectifier means for converting the alternating current voltage source input to pulsating direct current voltage;
   (b) a direct current voltage source which provides first and second reference voltages;
   (c) first and second comparators connected in series, the input to the second comparator being connected to a grounded voltage storage device;
   (d) means associated with providing the first reference voltage to the first comparator for increasing and then decreasing the first reference voltage following an indication of a power interruption or brownout condition.

* * * * *